No. 828,715. PATENTED AUG. 14, 1906.
W. F. COOK.
STRAINER.
APPLICATION FILED MAR. 27, 1906.
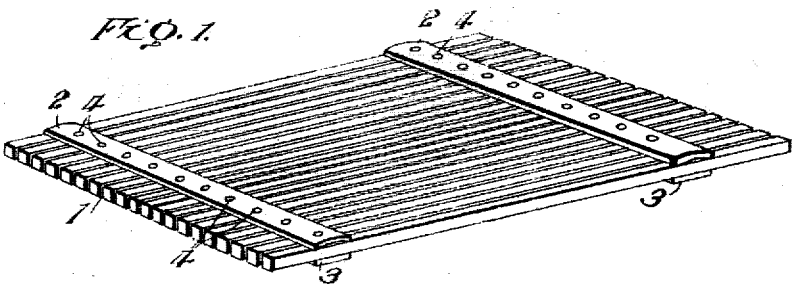
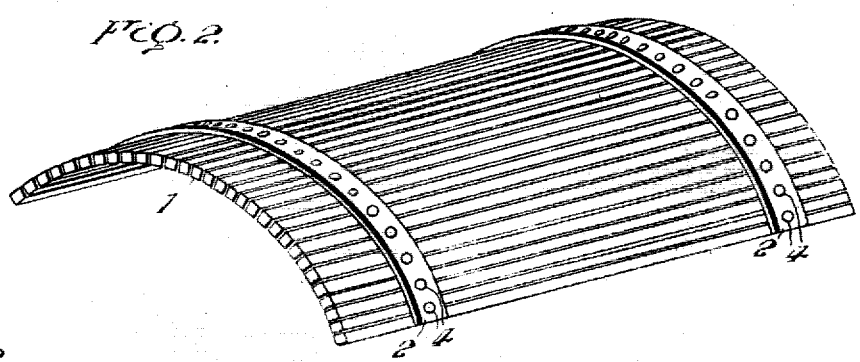
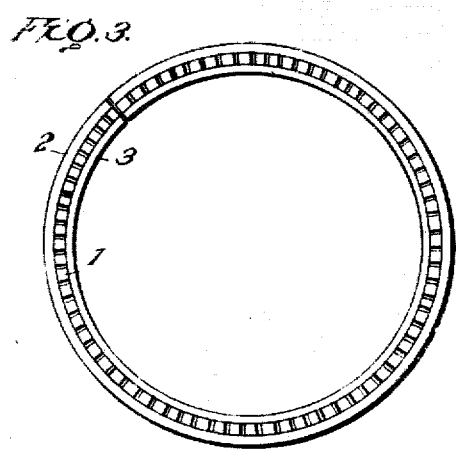
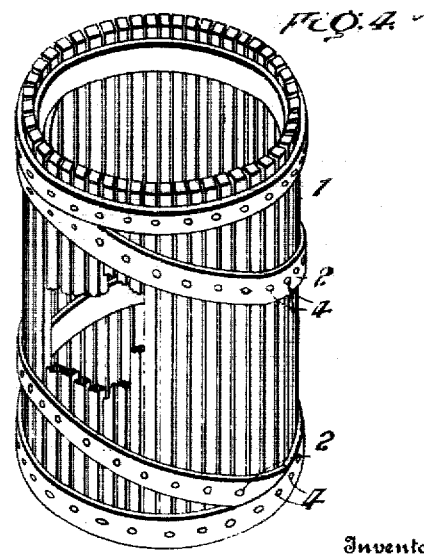
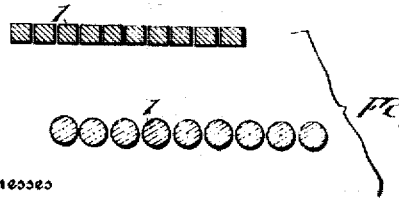
Inventor
William F. Cook,
Witnesses

UNITED STATES PATENT OFFICE.

WILLIAM F. COOK, OF LOUISVILLE, KENTUCKY.

STRAINER.

No. 828,715.  Specification of Letters Patent.  Patented Aug. 14, 1906.

Application filed March 27, 1906. Serial No. 308,291.

*To all whom it may concern:*

Be it known that I, WILLIAM F. COOK, a citizen of the United States, residing at Louisville, in the county of Jefferson and State of Kentucky, have invented certain new and useful Improvements in Strainers, of which the following is a specification.

This invention provides a strainer of novel construction which is adapted for use in wells, filtration plants, and wherever foreign matter, such as sand and gravel, is to be separated from water.

The invention consists of a strainer which may be flat, arched, cylindrical, or other form and which is composed of parallel bars, rods, or like elements connected by binding-strips, which constitute staying or bracing means.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a strainer of flattened form. Fig. 2 is a perspective view of a strainer of arched form. Fig. 3 is an end view of a strainer of cylindrical form having the bars or rods connected and braced by inner and outer circular bands. Fig. 4 is a perspective view of a cylindrical form of strainer having the bars or rods connected by inner and outer circular and spiral strips. Fig. 5 is a detail view showing some of the different forms of bars or rods.

Corresponding and like parts are referred to in the following description and indicated in all the views of the drawings by the same reference characters.

The strainer may be formed of any material, metal being preferred, that selected being of a nature not affected by moisture, such as brass, copper, or zinc. The bars or rods may be either of square, circular, trapezoidal, or other form in cross-section, as indicated most clearly in Fig. 5. The bars or rods 1 are spaced apart a short distance, the interspacing being determined by the particular service for which the strainer is designed. Strips 2 and 3 connect the bars or rods in series and are arranged in pairs upon opposite sides thereof. One of the strips, as 2, is transversely curved between its longitudinal edges and is provided at intervals in its length with openings 4, through which solder is flowed for connecting the strips to each other and to the bars or rods.

The strainer may be employed for separating foreign matter, such as sand and gravel, from water, and when mud or like impurity is to be separated from the water the screen is used in the capacity of a support for sustaining filtering material such as commonly employed for eliminating impurities held in suspension in the water.

The screen may be flat, as shown in Fig. 1, or curved or arched, as indicated in Fig. 2, or supplied in cylindrical form, as shown in Figs. 3 and 4. In the form shown in Figs. 3 and 4 the inner and outer connecting means may consist of circular bands, or the strips may have a spiral arrangement, as indicated in Fig. 4, the end portions being circular. In the construction shown in Fig. 4 the ends of the bars or rods are connected a uniform distance from their extremities and are braced and straight at intervals in their length by the spiral arrangement of the strips.

Having thus described the invention, what is claimed as new is—

A strainer composed of a series of bars or elements having a parallel arrangement and spaced apart a distance, pairs of terminal strips connecting the bars in series and bracing the same, and other pairs of strips connecting the bars and arranged between the terminal strips in a spiral or diagonal direction.

In testimony whereof I affix my signature in presence of two witnesses.

WILLIAM F. COOK. [L. S.]

Witnesses:
V. B. HILLYARD,
J. D. YOAKLEY.